(12) United States Patent
Schaefer

(10) Patent No.: US 7,475,799 B2
(45) Date of Patent: Jan. 13, 2009

(54) VEHICLE, AUXILIARY BAGGAGE CARRIER

(75) Inventor: David R. Schaefer, Seneca, SC (US)

(73) Assignee: Lakeland Gear, Inc., Candler, NC (US)

( * ) Notice: Subject to any disclaimer, the term of this patent is extended or adjusted under 35 U.S.C. 154(b) by 556 days.

(21) Appl. No.: 11/135,695

(22) Filed: May 24, 2005

(65) Prior Publication Data

US 2005/0274861 A1 Dec. 15, 2005

Related U.S. Application Data

(60) Provisional application No. 60/578,756, filed on Jun. 10, 2004.

(51) Int. Cl.
*B60R 9/00* (2006.01)
(52) U.S. Cl. .................. 224/493; 224/488; 224/494
(58) Field of Classification Search .............. 224/493, 224/494, 488
See application file for complete search history.

(56) References Cited

U.S. PATENT DOCUMENTS

| | | | | |
|---|---|---|---|---|
| 4,537,313 A | * | 8/1985 | Workman | 206/545 |
| 4,606,462 A | * | 8/1986 | Bogren | 229/201 |
| 5,415,332 A | * | 5/1995 | Kliot | 224/153 |
| 5,505,950 A | * | 4/1996 | Floyd et al. | 426/404 |
| 5,649,655 A | | 7/1997 | Kerner | |
| 5,738,262 A | * | 4/1998 | Andrini | 224/572 |
| 5,806,737 A | | 9/1998 | Clark | |
| 5,836,493 A | | 11/1998 | Grunsted et al. | |
| 5,836,494 A | | 11/1998 | Grunsted et al. | |
| 6,139,482 A | * | 10/2000 | Lafleur | 493/217 |
| 6,152,341 A | | 11/2000 | Le May et al. | |
| 6,439,634 B1 | | 8/2002 | Jensen | |
| 6,695,556 B2 | | 2/2004 | Addy | |

FOREIGN PATENT DOCUMENTS

EP  2367053 A  *  3/2002

* cited by examiner

*Primary Examiner*—Nathan J Newhouse
*Assistant Examiner*—Lester L Vanterpool
(74) *Attorney, Agent, or Firm*—Stephen R. Chapman

(57) ABSTRACT

A device to increase the stowage capacity of vehicles that comprises a fabric, box-like or cylindrical shaped receptacle and primary support straps and tie down straps to mount the receptacle on the rear or side of a vehicle and to minimize sway of the receptacle when the vehicle is in motion.

3 Claims, 13 Drawing Sheets

VEHICLE, AUXILIARY BAGGAGE CARRIER

RELATION TO PRIOR APPLICATIONS

This patent application claims the benefit of and priority of Provisional Patent Application No. 60/578,756 filed by Schaefer on Jun. 10, 2004 which Provisional Patent Application is hereby incorporated in its entirety, by reference.

FIELD OF THE INVENTION

This invention relates to automobile accessories. More specifically, it relates to auxiliary luggage carriers, and even more specifically, it is directed to an auxiliary luggage carrier comprised of a luggage receptacle or container and an attachment system to secure the receptacle on the rear of most vans, sports utility vehicles, and with modifications on the rear of virtually any automobile, or on the side of a vehicle.

BACKGROUND OF THE INVENTION

For many families, the sports utility vehicle (SUV), van or minivan, or traditional station wagon has become the vehicle of choice. In an era of smaller sized sedans, the interior space and passenger comfort and capacity are widely recognized design benefits. A common consumer criticism of these enormously popular vehicles is the marked lack of stowage space when the vehicle is transporting a full or nearly full load of passengers. Stowage space, generally regardless of make or model is limited to a small area behind the rear most seat, and depending on seating configuration, this space may be restricted.

Several approaches have been utilized to increase vehicle stowage capacity. The following provide representative examples and certain of their deficiencies.

Utilizing unutilized space in the body of a vehicle has been suggested. U.S. Pat. No. 6,439,634 issued Aug. 27, 2002 to Jones, et al. targets the use of space in the rear wheel wells of a vehicle. The '634 patent claims a device to ensure secure closure of a body panel enclosing such space. The amount of space is limited and frequently inconvenient to access.

Various types of car top carriers are available. In addition to the widely recognized, hard-body, box-type carriers attached to car top racks, or otherwise independently attached to the roof of vehicle, U.S. Pat. No. 6,257,470 issued Jul. 10, 2001 to Schaefer describes and claims a soft-sided, car top carrier that is generally secured to an existing car top luggage rack. All car top carriers suffer from one or more of the following deficiencies. All represent a significant source of wind resistance and drag when the vehicle is operated at highway speeds. All, because of their position on the roof of the vehicle, are exposed to potential damage on the road. Many are inconvenient to load/unload or access to recover stored items. Many, because of the roof position, have moderate weight limitations.

Special accessories have been developed for specific types of car top carriers. U.S. Pat. No. 6,649,655 issued Jul. 22, 1997 to Kerner describes and claims a "luggage rack for a motor vehicle with a steeply inclined end." The device is in fact a mechanism by which heavy loads can be lifted to a car top carrier fixed to the roof of the vehicle with a body style in which the back is inclined such that lifting and reaching to position the load on the carrier may be difficult.

Several US Patents relate to rear mounted cargo carriers, and equating "cargo carrier" with "stowage space" in various aspects they reflect alternatives to increasing vehicular stowage space. Several are specifically adapted to and dependent on an installed trailer hitch, and others describe only a support means without reference to any adaptations to store or transport any type of cargo or luggage.

For example, U.S. Pat. No. 6,293,451, issued to Le May and Trotter on Sep. 9, 2001 describes a telescoping device that is adapted to being mounted on a trailer hitch and can support a cargo container. Emphasis in the '451 patent is exclusively on the telescoping, support device. See also U.S. Pat. No. 6,152,341 which is a division of the of the same application by which a distinction between the assembly and carrier is made.

In addition, U.S. Pat. No. 5,836,494 issued Nov. 11, 1998 to Grunsted, et al. and U.S. Pat. No. 5,836,493 also issued to Grunsted et al. on Nov. 11, 1998 respectively claim a cargo carrier assembly and a cargo carrier mount. The mount is specifically adapted to a receiver-type of trailer hitch.

U.S. Pat. No. 6,695,556 issued to Addy on Feb. 24, 2004 provides a final example of the interest in and diversity of approaches to increasing stowage or carrying capacity of vehicles. The '556 patent is directed to a tie-down device adapted primarily to pickup trucks. The device is adapted to being secured to the upper surface of the tailgate of the vehicle and providing means to secure extra long loads that would extend beyond the length of the bed of the vehicle. In addition, the device has hooks on which individual pouches or similar containers can be secured with their contents. The bags are not otherwise secured to the device or vehicle.

There remains need and room in the field for a device that increases stowage capacity of vehicles, such as SUV's, can be adapted to other vehicles, has a strap suspension system to secure a container or receptacle to the vehicle where it is easily loaded and does not create excessive drag on the vehicle, and is protected by the vehicle body from road debris.

BRIEF SUMMARY OF THE INVENTION

A primary purpose of the invention is to increase the stowage or luggage carrying capacity of various types of motor vehicles.

An additional purpose of the invention is a stowage receptacle that can be positioned in the rear, on the trunk, or on the side of a vehicle and secured by a primary support strap system and a tie down strap system.

An additional purpose of the invention is a strap support system that securely attaches a receptacle to the vehicle at both the top and bottom of the vehicle, thereby ensuring stable positioning of the receptacle.

These and other purposes are satisfied by an auxiliary baggage carrier with three major elements: a fabric receptacle, a system of primary support straps that are attached to the receptacle, and serve to attach the receptacle to a vehicle and support the receptacle, and a system of tie down straps that are connected to the receptacle and generally to the primary support straps and that serve to stabilize the receptacle and minimize sway when the vehicle is in motion, and further by a receptacle that is either box-like in shape or is cylindrical in shape shaped and made from any of a variety of materials including a vinyl covered polyester, and cotton material, or any synthetic fabric, and by a receptacle with the primary support straps positioned such that the receptacle can be positioned on the rear of a vehicle, attached to the trunk of a passenger car, or positioned on the side of a vehicle.

These and other feature and attributes of the invention will be better understood by reference to the following descriptions, examples, figures, and appended claims.

EMBODIMENTS AND EXAMPLES

The invention is described in a variety of configurations with respect to the size and shape of a receptacle and with respect to the pattern of attachment of the primary support straps and tie down straps. Regardless of the specific example, the basic function of the primary support straps is to bear the weight of the receptacle and to secure the receptacle to a vehicle. The basic function of the tie down straps is to secure the receptacle to the vehicle body and thereby to minimize lateral swaying of the receptacle when the vehicle is moving. In the following examples, the tie down straps are secured to the receptacle by passing them through guides formed by the attachment of the primary support straps to the receptacle. Directly attaching the tie down straps is also anticipated by the invention and a fully acceptable alternative for each of the following examples.

Figure 1A:
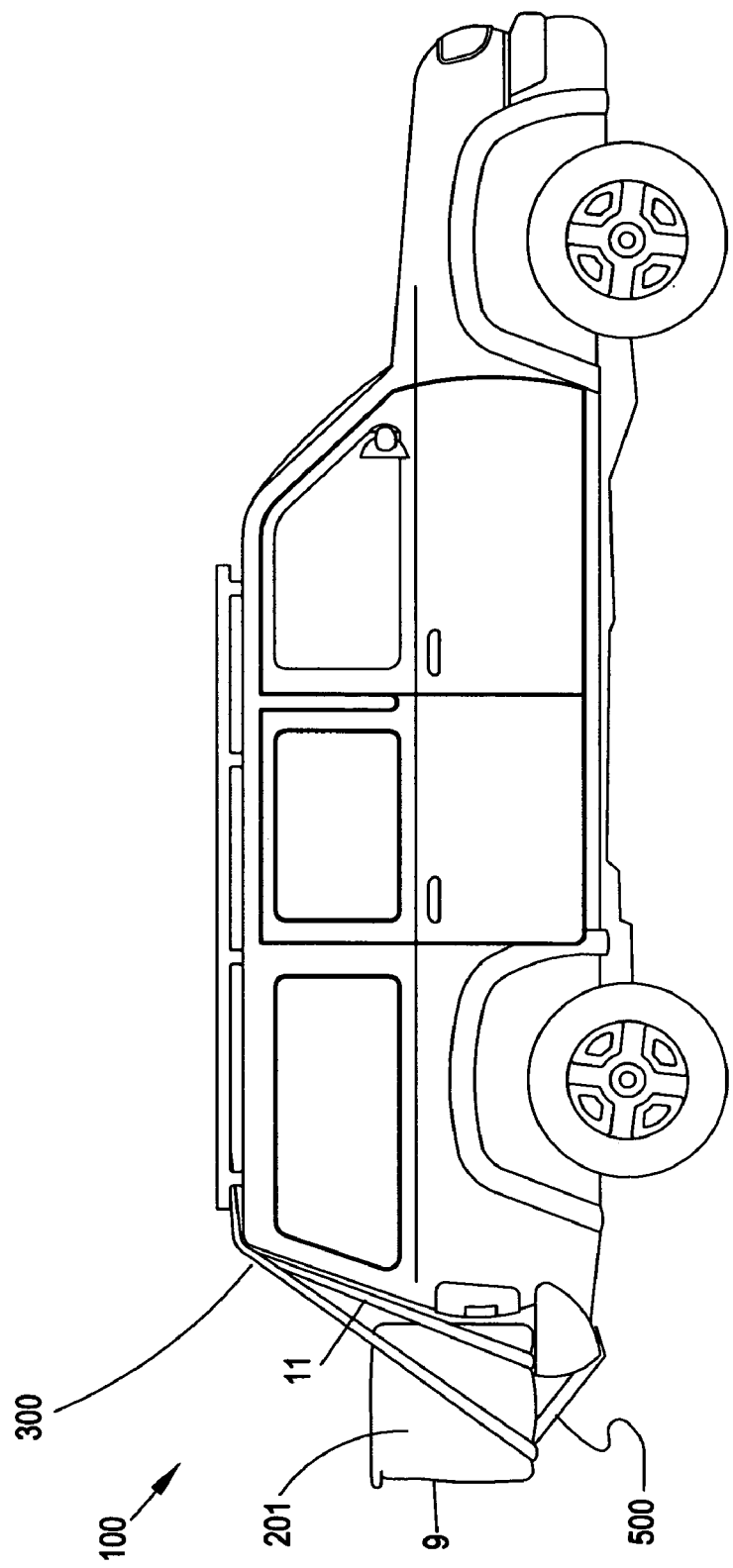
FIG. 1A is a profile view of a simple embodiment of the invention.

As viewed in FIG. 1A, the invention 100 illustrated in its simplest form comprises a six-sided receptacle 201 and a support system comprising two elements, primary support straps 300 that bear the weight of the loaded receptacle and are securely attached to the receptacle, and tie-down straps 500 that secure the bottom of the receptacle to the vehicle and serve to stabilize it in position and to minimize lateral sway of the receptacle 201.

The receptacle 201 may be fabricated from a variety of materials. A bi-layered synthetic material made of vinyl covered polyester is useful in that it is adequately water resistant to protect the contents of the loaded receptacle, reasonable light weight, and secure seams can be stitched to join the pieces of the receptacle. Other synthetic fabrics and materials are acceptable including, but not limited to nylon and various polyesters and various types of cotton material. Water proofing material is not required, but it is strongly recommended unless the material is of itself waterproof.

All support straps are made from flat webbing material. Strength and resistance to stretching are considerations. The primary support straps 300 are made from 2 inch (5 cm) webbing, and the tie-down straps are made from 1 inch (2.5 cm) material. A supplemental, primary support strap, not illustrated, is also made from 2 inch (5 cm) webbing.

The six elements of the receptacle 201 are described in FIG. 1. The six-sided receptacle 201 is assembled by joining designated edges of the several pieces. Although various adhesives and heat sealing means can be used to join the edges, stitching is the preferred and most common means to form the seams joining the adjacent pieces. The receptacle 201 comprises a bottom piece 3 with a front edge 21 a back edge 17, a first end edge 19, and a second end edge 23. In addition the receptacle 201 comprises a first end piece 5 with a bottom edge 25, a top edge 29, a first end edge 27, and a second end edge 31, and a second end piece 7 with a bottom edge 33, a top edge 37, a first side edge 35, and a second side edge 39. Further, the receptacle 201 has a front piece 9 (also indicated in FIG. 1A) with a bottom edge 57, a top edge 63, a first end edge 59, and a second end edge 61. The receptacle 201 includes a back piece 11 with a top edge 45, a bottom edge 41, a first end edge 43, and a second end edge 47, and a top piece 15. The top piece 15 has a top edge 53, a bottom edge 49, a first side edge 51 and a second side edge 55. One skilled in the art recognizes that the six pieces need not be separated. For example, the bottom piece 3 and two end pieces 5 and 7 may be formed from a single piece of material with seems stitched or otherwise formed only to achieve the desired form of the receptacle.

When the receptacle is positioned on the rear of a vehicle as shown in FIG. 1A, the back piece 11 is adjacent to and pressed against the rear of the vehicle, and the front piece 9 faces to the rear, with respect to the direction of the vehicle.

Figure 2:
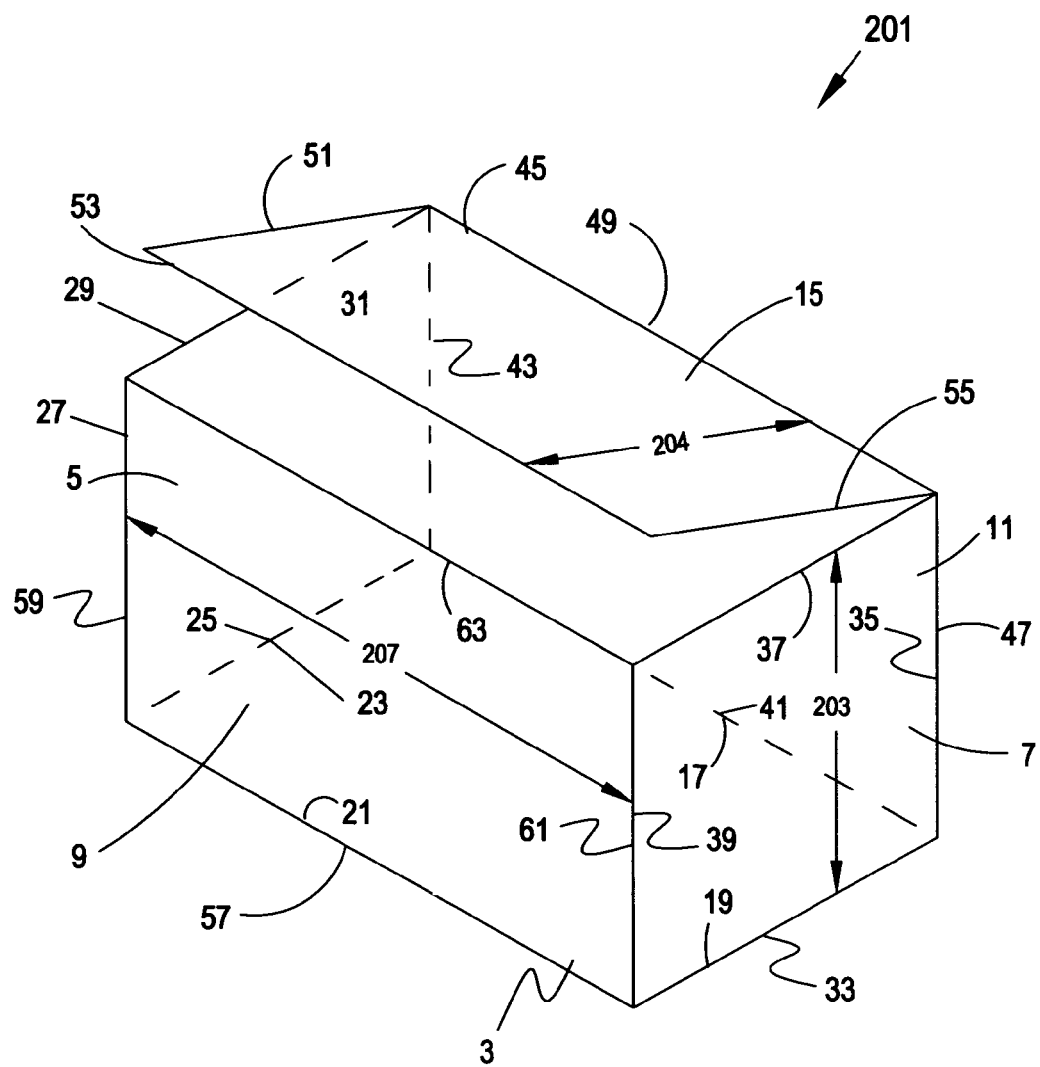
FIG. 2 illustrates the completed receptacle, including dimensions.

The completed receptacle 201 of FIG. 2 illustrates which edges are connected. The front piece 9 is connected by stitched seams to the bottom piece 3 along the base piece bottom edge 21 and the front piece bottom edge 57. The front piece 9 is connected by stitched seam to the first end piece 5 by front piece edge 59 and first end piece edge 27, and the first end piece 5 is connected by stitched seam to the bottom piece 3 along bottom edge 23 and first end piece bottom edge 25. Similarly, front piece 9 is connected by stitched seam to the second end piece 7 by front piece end edge 61 with second end piece edge 39, and second end piece 7 is also connected by stitched seam to bottom piece 3 along bottom piece end edge 19 and second end piece bottom edge 33.

Back piece 11 is attached by stitched seams to the bottom piece 3 along bottom edge 17 and back piece bottom edge 41, and to the first end piece 5 by first end piece edge 31 and bottom piece end edge 43, and to the second end piece 7 along back piece end edge 47 and second end piece edge 35.

The top piece 15 by stitched seam is connected by top piece bottom edge 49 to the top edge 45 of back piece 11. The connection between the top piece first end, edge 51, front edge 53, and second end edge 55 with respectively the top edge 29 of the first end piece, the top edge 63 of the front piece 9, and the top edge 37 of the second end piece 7 is by a releasable closure/attachment means, preferably a zipper; however other types of releasable closure means including, but not limited to snaps and various types of adhesive-like strips are suitable. A zipper such as a No.10 zipper is stitched the full length of the first end piece, top piece, and second end piece and corresponding portion of the top to secure the closure means. A 2 inch (5 cm) flap may be stitched the full length of the zipper and attached above the zipper to form a protective flap (not illustrated).

The exact dimensions of the receptacle 201 are not critical, but are reasonable limited by practical considerations of the vehicle on which it is to be secured. The width 207 varies from less than 36 to 44 inches (90 to 110 cm) and is preferable approximately about 40 inches (100 cm). The height 203 varies from 24 to 30 inches (60 to 75 cm) preferably approximately about 28 inches (70 cm), and the depth 204 varies from approximately 16 to 26 inches ((40 to 65 cm). The foregoing dimensions are by way of illustration, not limitation.

Figure 3:
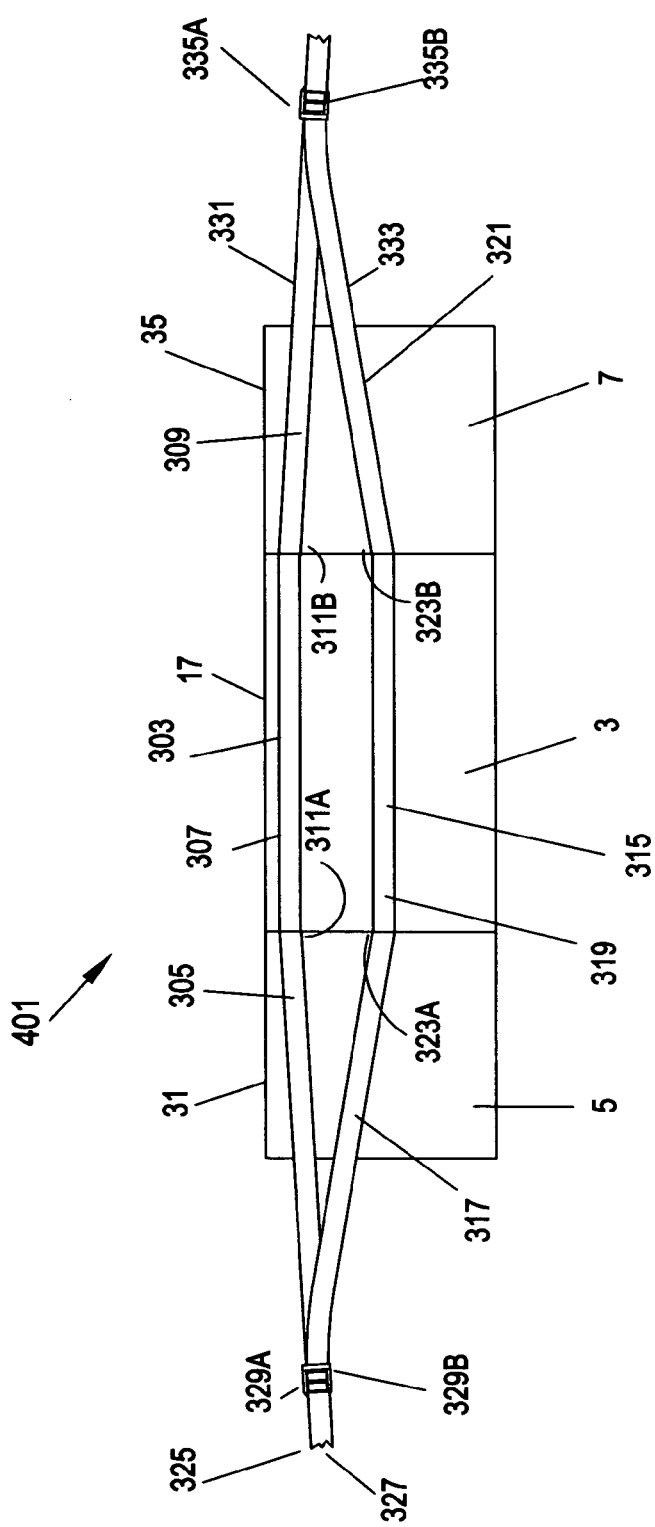
FIG. 3 illustrates one arrangement of attachment of primary support straps on the receptacle.

As illustrated in FIG. 3, the primary support strap system 301 comprises two web straps. A first support strap 303 and a second support strap 315. The first support strap 303 is positioned along the rear edge of the bottom piece 3, the first end piece 5 and the second end piece 7 edges 17, 31 and 35, respectively. Section 307 of the first support strap 303 is stitched to the bottom piece 301; sections 305 and 309 of the first support strap are stitched respectively to the first end piece 5 and the second end piece 7. The first support strap extends on both ends 325 and 331 extend 3 to 6 feet (1 to 2 m) to provide webbing to attach to the strapping and secured receptacle to the vehicle as described in FIG. 6. Sections 305 and 309 are angled inward to the center starting at points 311A and 311B. This angle (approximately about 5 to 10 degree helps position and balance the loaded receptacle on the vehicle.

The second support strap 315 is also attached to the bottom piece 3 and first end piece 5 and second end piece 7 in a manner similar to that described for the first support strap 303. The center section 319 of the second support strap is stitched to the bottom piece 3 along approximately a centerline of that piece. sections 317 and 321 of the second support strap are stitched to the first end piece and second end piece respectively, as illustrated in FIG. 3. Both sections 317 and 321 are angled inward at points 323A and 323B respectively. The degree of angle is greater than the angle of the first support strap, but the angle also allows the support straps to better support and balance the attached receptacle. Both ends of the second support strap extend a length of from 3 to 6 feet (1 to 2 m) and, as for the first support strap serve to connect the straps, hence the receptacle to the vehicle. At each end of the support strap system, 329 and 335, the pairs of ends, one member of each pair from the first support strap and the other member from the second support strap 329 A/B and 335A/B respectively are fitted with complimentary parts of coupling devices, such as a side release buckle such that the ends can be securely joined to hold the receptacle 201 in position when the free sections of the straps 325 and 327 and 331 and 333 respectively are connected to the vehicle.

Figure 4:
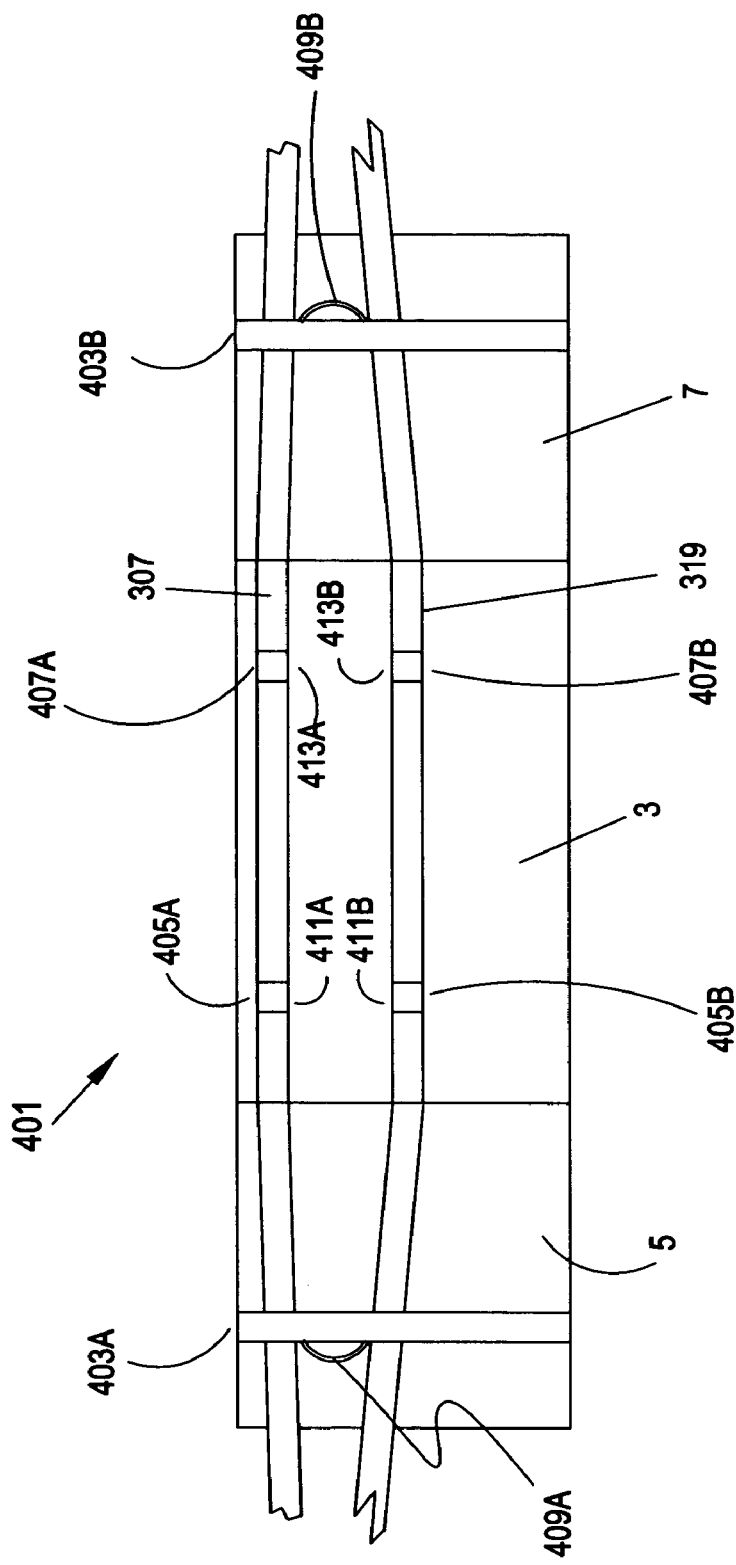
FIG. 4 illustrates details of the primary strap support system.

Additional details of the support strap system are shown in FIG. 4. First and second reenforcing pieces 403A and 403B are stitched across the first end piece 5 and the second end piece 7, respectively to further anchor the first and second support straps. In addition, a handle is formed by each reenforcing piece 409A and 409B.

As illustrated in FIG. 4, at two pairs of points on the support straps positioned on the bottom piece 3, points 405A and 405B and points 407A and 407B the stitching securing the strap to the bottom piece is modified to form a guide for the tie down straps, 411A and 411B and 413A and 413B, respectively. A first tie down strap is passed under the support straps via guides 411A and 411B and the second tie down strap is similarly passed under the support straps by guides 413A and 413B. In the above manner, the tie down straps are thus connected to the receptacle and when connected to the vehicle serve to connect the receptacle to the lower portion of the vehicle.

Figure 5:
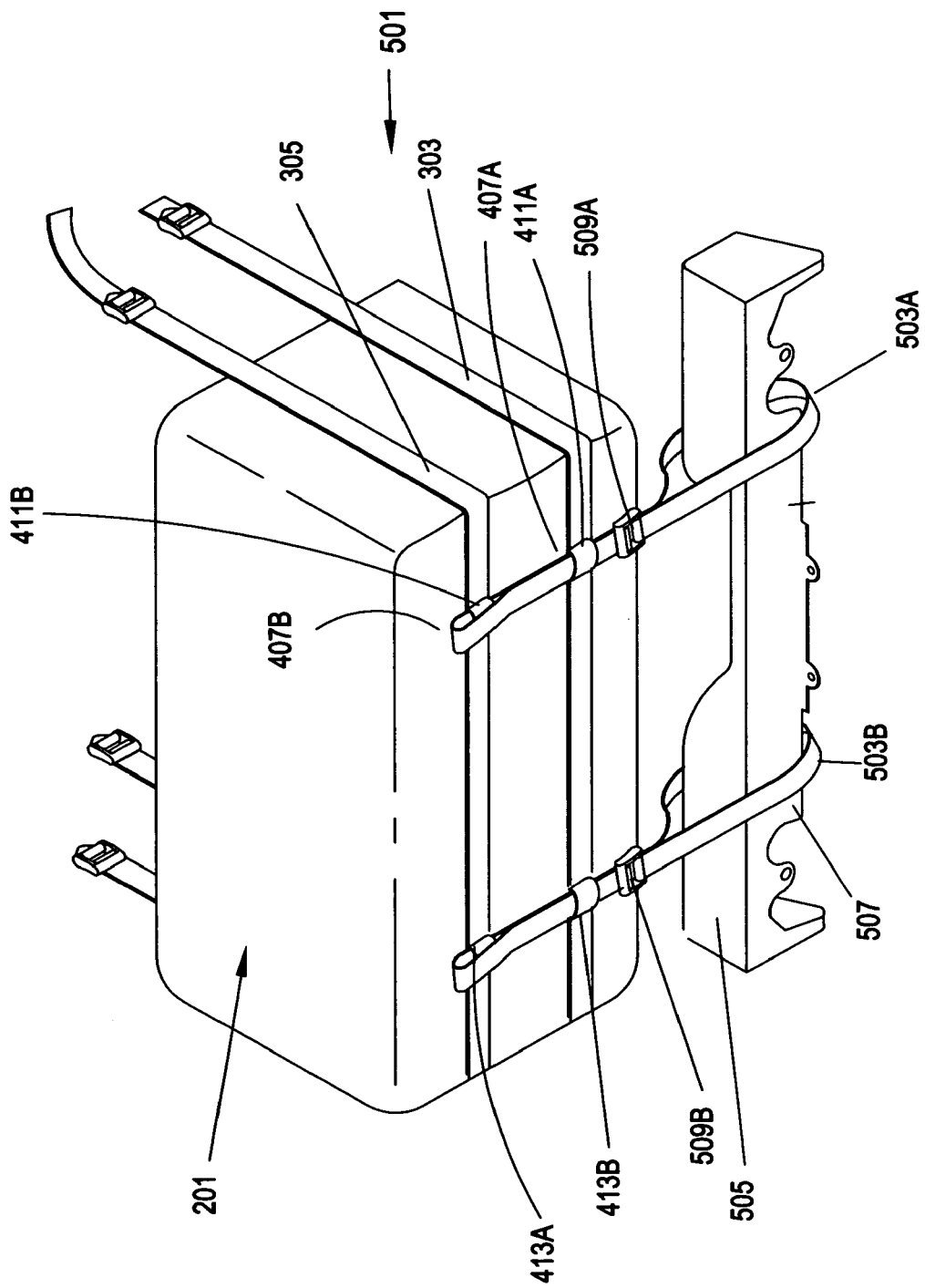
FIG. 5 illustrates details of the tie-down strap system.

Details of the tie down system 501 are shown in FIG. 5. The receptacle 201 is connected to the vehicle and supported by the two support straps 303 and 305. The first tie down strap 503A is threaded through the first pair of guides 411A and 411B (see FIG. 4) and secured around a body member of the vehicle 507, as illustrated this is part of a trailer hitch, but it can be any body member at the rear of the vehicle. The ends of the first tie down strap are connected by a buckle 509A. Similarly, the second tie down strap 503B is threaded through the second pair of guides 413A and 413B (see FIG. 4) and secured around a body member 507; the ends of the second tie down strap are connected by a buckle 509B. The buckles 509A and 509B allow the lengths of the tie down straps to be adjusted (tightened) securing the receptacle 201 to the lower rear portion of the vehicle.

Figure 6:
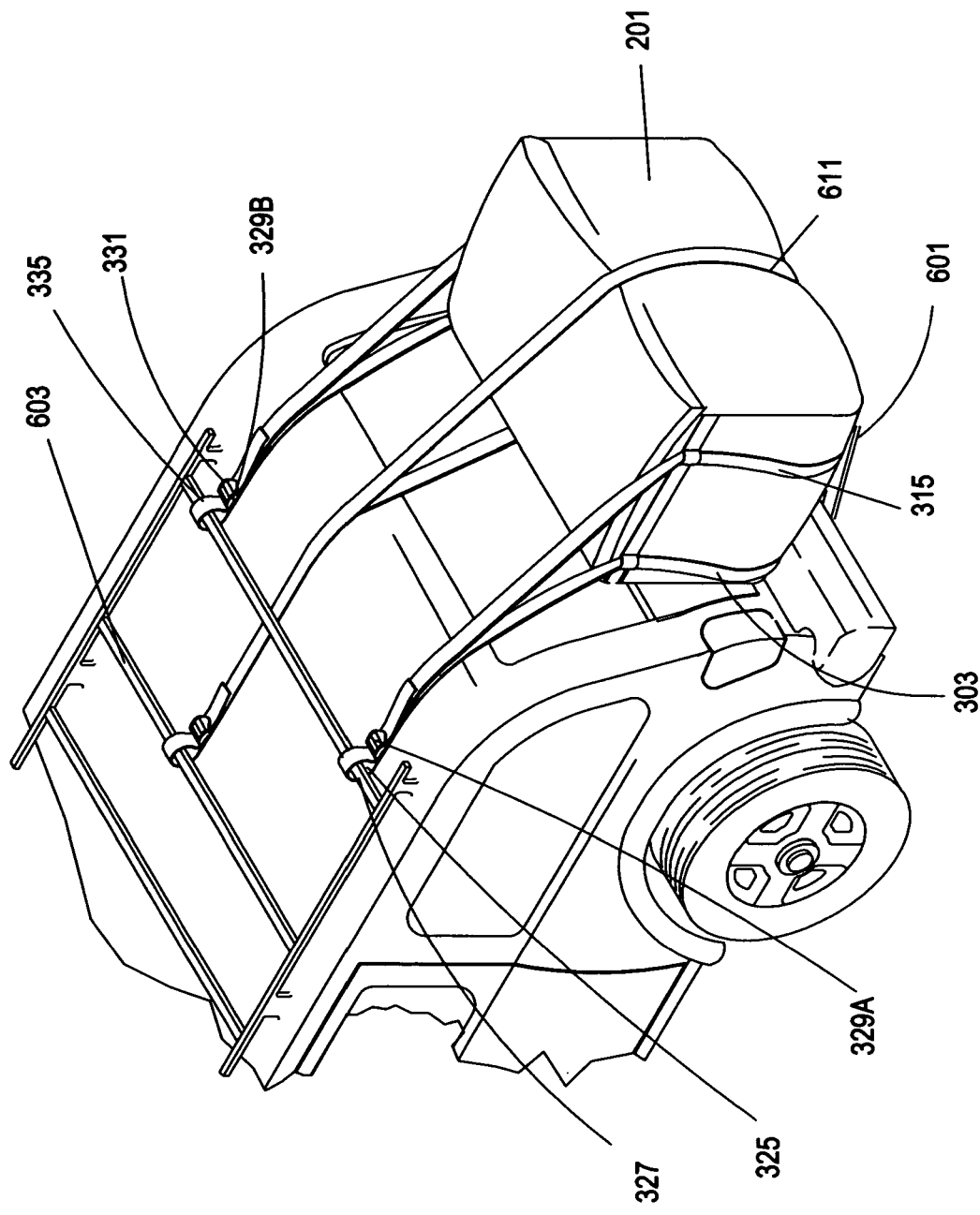
FIG. 6 illustrates the receptacle secured to a the back of a vehicle and details of the attachment of the attachment of the primary strap supports to the vehicle.

As illustrated in FIG. 6, the receptacle 201 is supported by the first support strap 303 and the second support strap 315. The first extended end of the first support strap 325 is secured around a member of a car top carrier 603 and connected by a buckle means 329A to the first extended end of the second support strap 327. In the same manner the second extended end of the first support strap 331 is secured around a member of a car top carrier 603 and by buckle means 329B is connected to the second extended end of the second support strap 335.

The buckles 329A and 329B allow slack to be taken up in each of the two support straps 303 and 315 thereby securing the receptacle 201 to the vehicle. An optional strap 611 passes around the receptacle 201 and the ends (not illustrated) are secured around a forward member of the car top carrier 603 and connected by a buckle. The optional strap 611 provides additional support for the receptacle. In an alternate configuration, the optional strap may pass around the receptacle at right angle to the support straps and attach to the sides of the vehicle through the doors to provide additional lateral support to the receptacle.

The tie down straps do not require a trailer hitch for attachment to the vehicle. As one skilled in the art recognizes, numerous other structural elements of a vehicle may be used, such as the bumper or bumper supports. Using such alternative points may require the use of connecting hooks or rings, but this minor modification is fully within the scope and intent of the invention.

Similarly, although an installed car top carrier is convenient and commonly found on SUV's and similar vehicles, it is not essential. Any of a variety of removable, cross-bar carriers that attach to car tops may be appropriate. Such carriers are frequently the foundation for bicycle carriers and the like.

In one embodiment, the bottom of the receptacle is reenforced by inserting a hard material (wood, plastic, or similar material) insert into the receptacle. Dimensions of the insert are fractionally smaller than the bottom piece. In a second embodiment, light disposable plastic liners are places in the receptacle to protect it from wet, dirty, or otherwise offensive materials.

Figure 7:
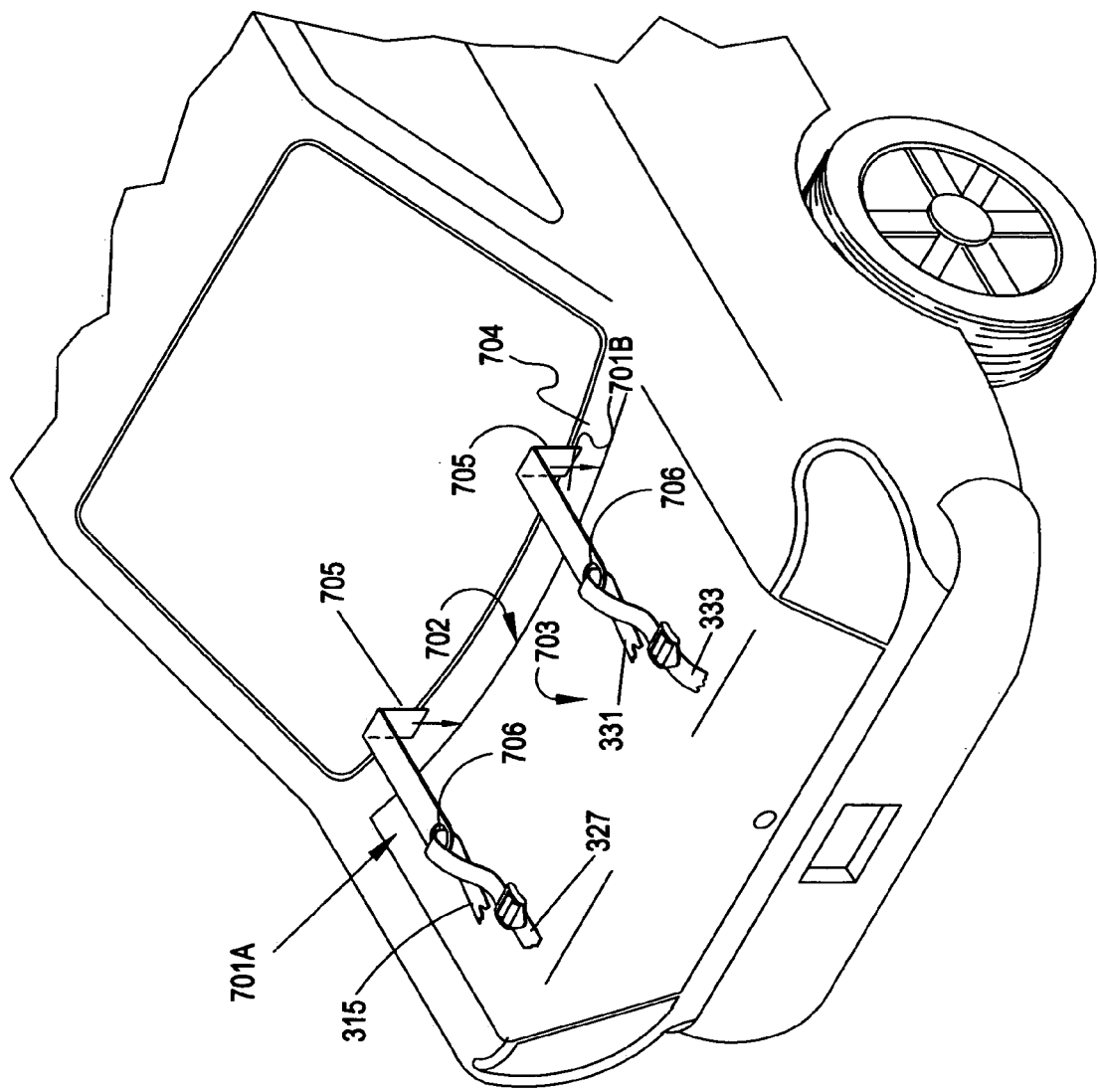
FIG. 7 illustrates the attachment of the support straps to the trunk of a passenger car.

The invention anticipates yet another embodiment that allows the receptacle to be positioned at the rear of most common passenger cars. In this embodiment, the dimensions of the receptacle may be, but are not required to be closer to the lower values in examples previously described. The receptacle and support system and tie down straps are as described, except for a modification of the support straps. As illustrated by FIG. 7 rather that attaching to the vehicle by means of a car top carrier or similar device, the straps attach to the vehicle by means of wide "L" shaped hook devices 701A and 701B, one end of each hook 705 is secured by sliding into the joint 702 formed between the trunk lid 703 and the rear body 704 of the vehicle. The other end 706 of each hook is an open "U" designed to secure the support straps 315/327 and 331/333.

Figure 8:
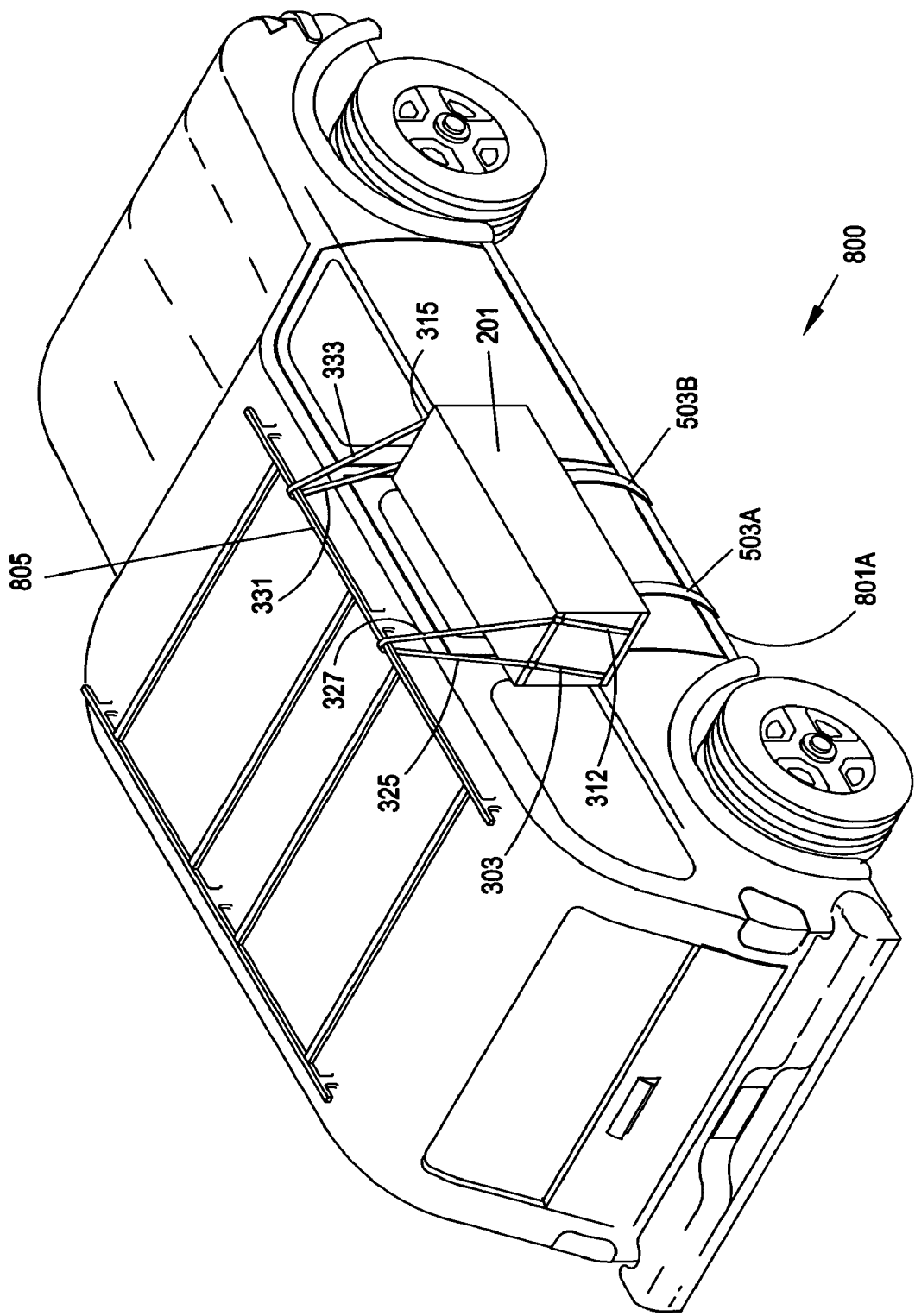
FIG. 8 illustrates a receptacle adapted to being mounted on the side of a vehicle.

FIG. 8 illustrates an additional variation of the device with the receptacle mounted on the side of a vehicle. The support straps 303 and 315 are attached to the receptacle as illustrated in FIG. 3. The pairs of extended ends, 325/327 and 331/333, are attached to a horizontal member of a car top carrier 805. The tie down straps 503A and 503B are secured to a side frame body member 801A and 801B. In practice, referring to the dimensions described in FIG. 2, the length 207 of the receptacle 201 may be extended too approximately six (6) feet (2 m), the depth 204 may be reduced to a practical maximum of 18 inches (45 cm), and the height 203 limited to about two (2) feet (50 cm). The relative lengths of the support and tie down straps may be adjust so as to position the receptacle below or above the window bottom line.

Figure 1B:
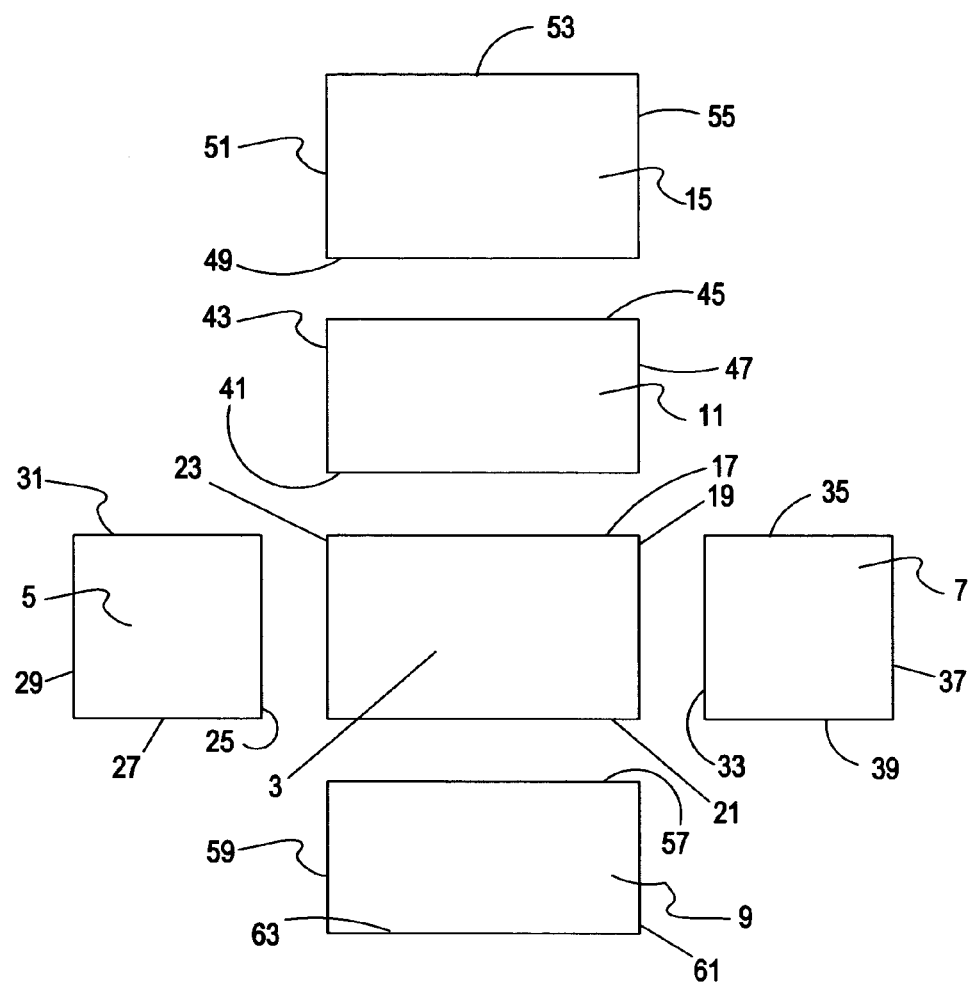
FIG. 1B illustrates the arrangement of the six pieces of fabric from which a receptacle is made.
Figure 9:
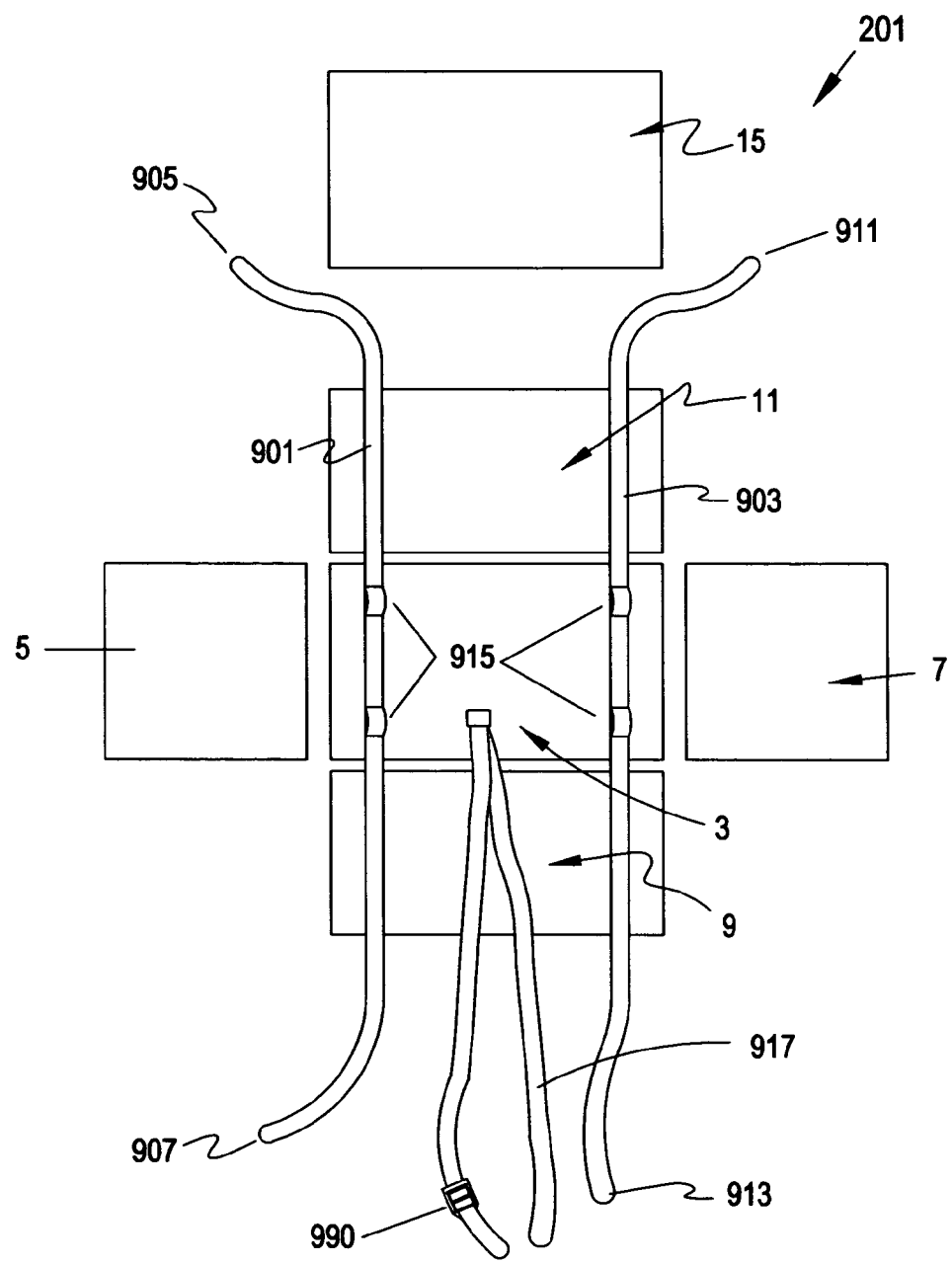
FIG. 9 illustrates an alternative arrangement of the primary support straps on rectangular-based receptacle.

FIG. 9 illustrates an alternative arrangement of the attachment of the primary support straps attachment to the receptacle. Rather than being attached to the bottom piece and end pieces as illustrated in FIG. 1B, The first primary support strap 901 and second primary support strap 903 are attached (commonly stitched) to the bottom piece 3 and to the front piece 9 and to the back piece 15. Stitching of both primary support straps 901 and 903 is modified as in FIG. 1 to form four (two pairs of) tie down strap guides 915. Primary support strap 901 has a pair of free ends 905 and 907. Similarly, primary support strap 903 has a pair of free ends 911 and 913. Each pair of free ends 905/907 and 911/913 is connected by a buckle device after one of the members of each pair is secured around a car top carrier or similar body accessory on the vehicle, as illustrated by FIG. 10.

Figure 10:
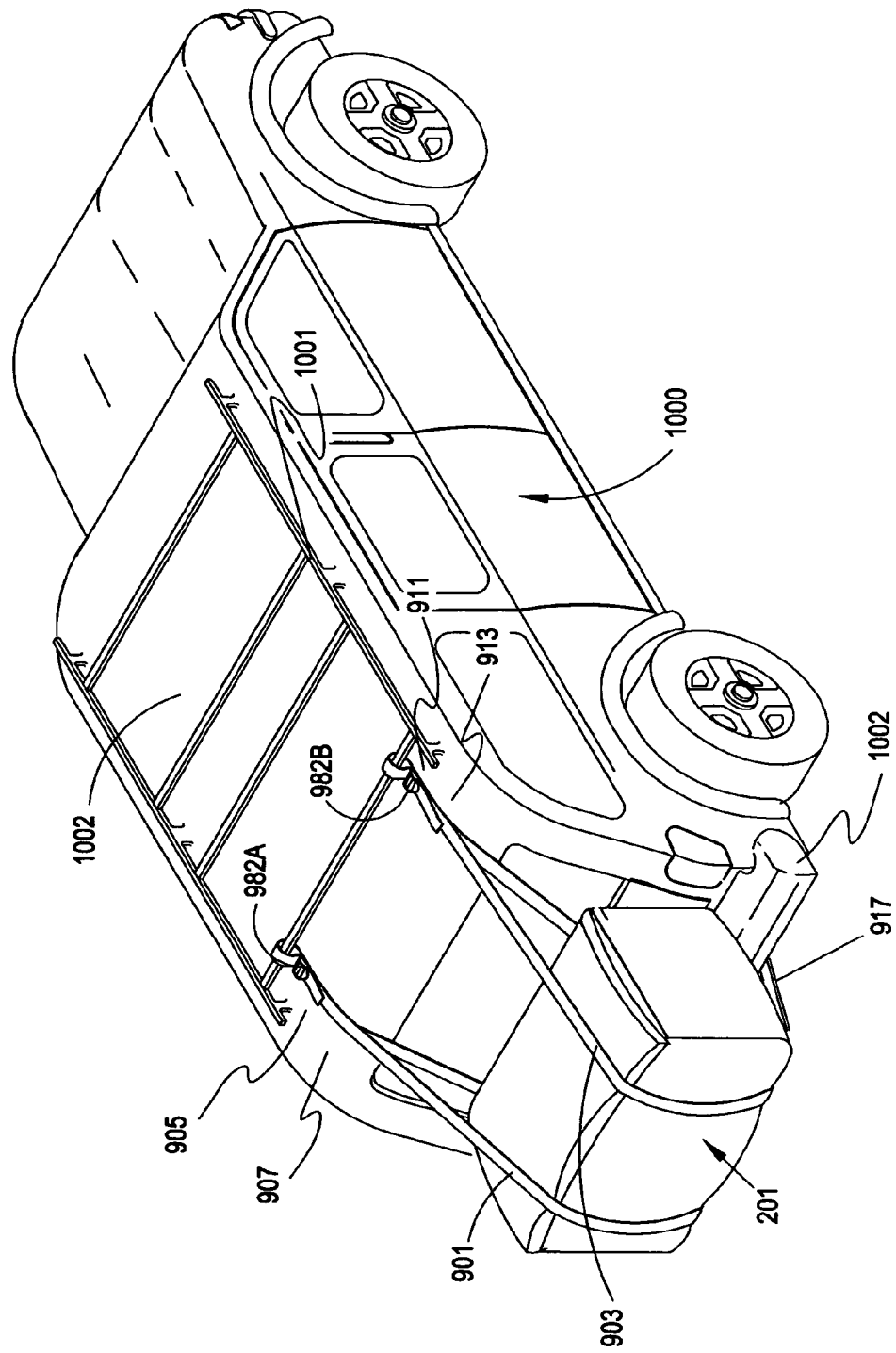
FIG. 10 illustrates a receptacle supported by the alternative arrangements of the primary support straps.

The receptacle 201 and support straps 901 and 903 of FIG. 9 ars illustrated in FIG. 10 secured to the rear of a vehicle 1000. The free ends of first 901 and second 903 support straps 905/907 and 911/913, respectively, pass around a member of the car top carrier 1001 and each pair of ends is joined by a buckle device 982A and 982B, respectively, by which slack in the support straps caqn be adjusted. At least one tie down strap 917 is attached to the bottom of the receptacle 201, passes around a body member 1002, with the free ends joined by a buckle device 990, as previously described.

Figure 11:
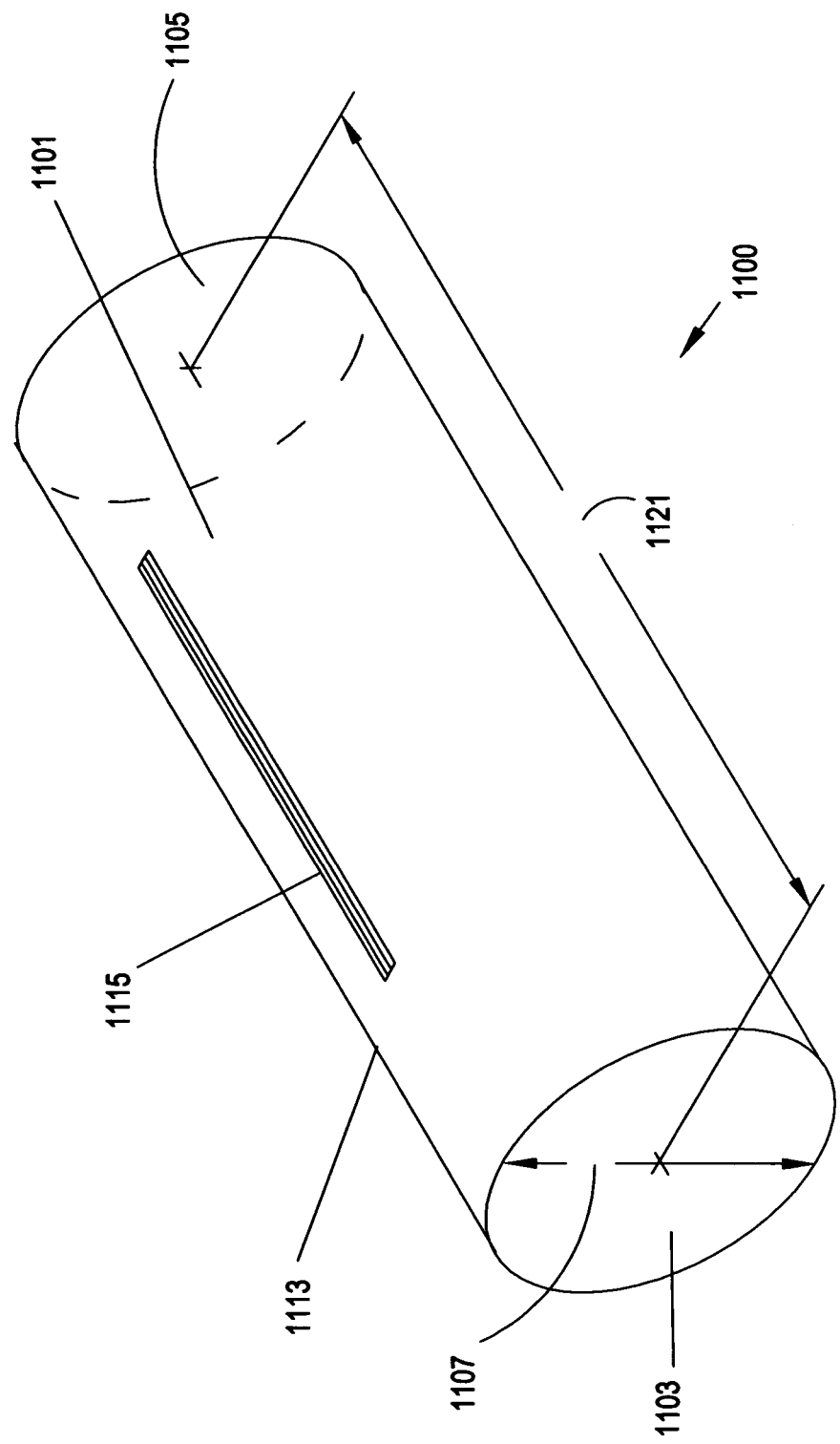
FIG. 11 illustrates a cylindrical receptacle.

FIG. 11 shows a cylindrical or tubular shaped receptacle 1100 capable of being attached to a vehicle by primary support straps and tie down straps. For convenience, but not as a limitation, this configuration is described for a structure with circular end pieces thereby forming a tubular or cylindrical receptacle. One skilled ion the art recognizes that an oval or similar shapes are also anticipated in this example and are within the scope and purpose of the invention.

The receptacle 1100 comprises three pieces: a body, sleeve, or tube piece 1101, a first end piece 1103 and a second end piece 1105. The end pieces 1103 and 1105 are attached to opposite ends of the body piece 1101, usually by stitching. The seam 113 that attaches the facing edges of the material from which the body piece is formed is stitched only a short distance inward from each end towards the middle of the length of the seam. A slide closure device 1115, most commonly a zipper, is secured to the opposing edges to close the remainder of the seam and to provide access to the receptacle. The length of the receptacle is determined by the length of the sleeve 1121. This dimension is generally limited to the same length as the width of the receptacle of FIG. 2. With circular ends, both the height and depth of the receptacle are determined by the diameter 1107 of the end pieces 1103 and 1105. In practice, these are comparable to the depth of the receptacle of FIG. 2. It is recognized that an oval or similar configuration would not have equal height and depth. For reference purposes hereafter, the "top" of the circular receptacle is the surface adjacent to the zipper closure and the "bottom" is the opposite surface 1121.

Figure 12A:
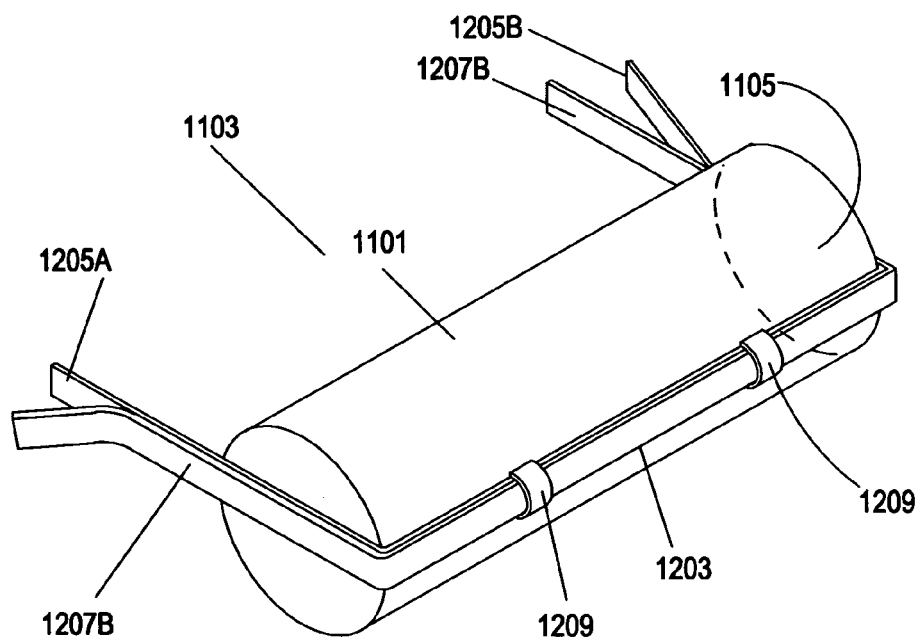
FIG. 12A illustrates the primary support attachment to a cylindrical receptacle.

FIG. 12A illustrate one alternative configurations for the attachment of the primary support straps to a tubular receptacle. In FIG. 12A, a pair of primary support straps 1201 and 1203 is attached to the receptacle along the length of the bottom 1121 of the body piece 1101 and vertically along each end piece 1103 and 1105 (visible as illustrated only for 1103). Each primary support strap 1201 and 1203 has two free ends 1205A/B and 1207A/B, respectively. The receptacle is attached to a vehicle by securing the one member of each pair of free ends to a car top element and connecting the ends with a buckle device. The tie down straps are connected through guides 1209 as previously described.

Figure 12B:
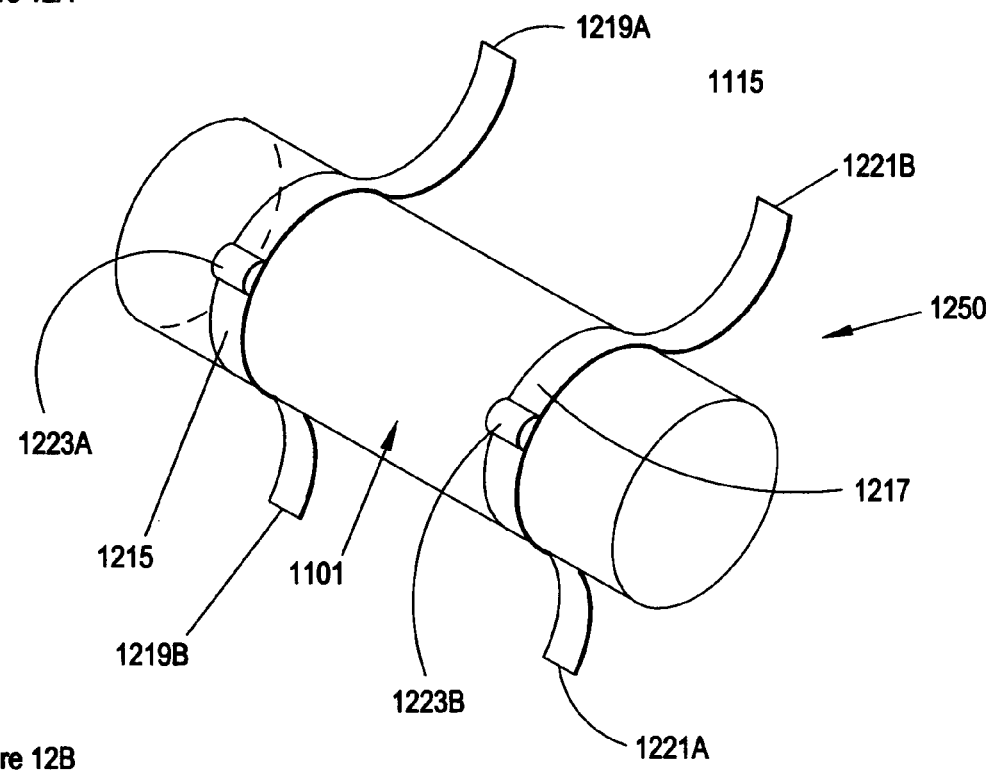
FIG. 12B illustrates an alternative arrangement of the primary support straps on a cylindrical receptacle.

FIG. 12B illustrates a second alternative for the attachment of the primary support straps 1215 and 1217 to a tubular receptacle. Each of the primary support straps 1215 and 1217 is attached to approximately two thirds of the circumference of the body piece 1101 at a short distance from opposite ends. Each support strap 1215 and 1217 has two free ends 1219A/B and 1221 A/B, respectively. The free ends are employed to secure the receptacle to the vehicle as previously, and the members of each pair are connected by a buckle device. The tie down guides 1223A and 1223B are formed as previously described, and the tie down straps are attached to the vehicle as previously described.

Preferred embodiments and examples of the invention have been described using specific terms, dimensions, and examples. The terms, dimensions, and examples are for illustrative purposes only, and thus are terms of description, not of limitation. It is to be understood that those of ordinary skill in the art may make changes and variations without departing from the scope or spirit of the invention. Different aspects of the embodiments may be interchanged in whole or impart to yield even additional embodiments. Therefore the scope of the appended claims should not be limited to the descriptions and examples herein.

I claim:

1. An auxiliary vehicle baggage carrier support system comprising:

a primary support strap system adapted to attaching a receptacle to a vehicle and comprising a first strap support and a second strap support, wherein said first support strap and said second support strap are individually, securely fastened along the width of the bottom piece of a fabric receptacle, wherein said fabric receptacle comprises said bottom piece, wherein said width of said bottom piece is defined as the dimension parallel to the bumper of said vehicle to which said receptacle is attached and further wherein the height of said receptacle is defined as the vertical dimension of said receptacle with respect to the horizontal plane, and the depth of said receptacle is the dimension parallel to the length of said vehicle to which said receptacle is attached, and a first end piece and a second end piece, and further wherein a first segment of said first support strap is securely fastened to said first end piece and a second segment of said first support strap is securely fastened to said second end piece and a first segment of said second support strap is securely fastened to said first end piece and a second segment of said second support strap is securely fastened to said second end piece, further, wherein said first segment of said first support strap and said first segment of said second support strap are fastened to said first end piece at an angle such that their ends meet at a length from the upper edge of said first end piece at a first coupling point and said second segment of said first support strap and said second segment of said second support strap are fastened to said second end piece at an angle such that their ends meet at a distance from the upper from the upper edge of said second end piece at a second coupling point, and further, wherein said first coupling point and said second coupling point provide means by which said first support strap and said second support strap are connected said receptacle to a vehicles, and further wherein guides are formed in said first support strap and said second support strap at points on said bottom piece; and a tie-down strap system comprising two tie-down straps wherein each of said two tie-down straps is independently secured by said guides to said base piece and further wherein each of said two tie-down straps is independently connected to a member of the frame of said vehicle so as to connect the bottom of said receptacle to the vehicle and further stabilize and support said receptacle mounted on said vehicle.

2. The invention of claim 1 wherein the receptacle is attached to the rear of a vehicle.

3. The invention of claim 1 wherein the receptacle is attached to the side of a vehicle.

\* \* \* \* \*